UNITED STATES PATENT OFFICE.

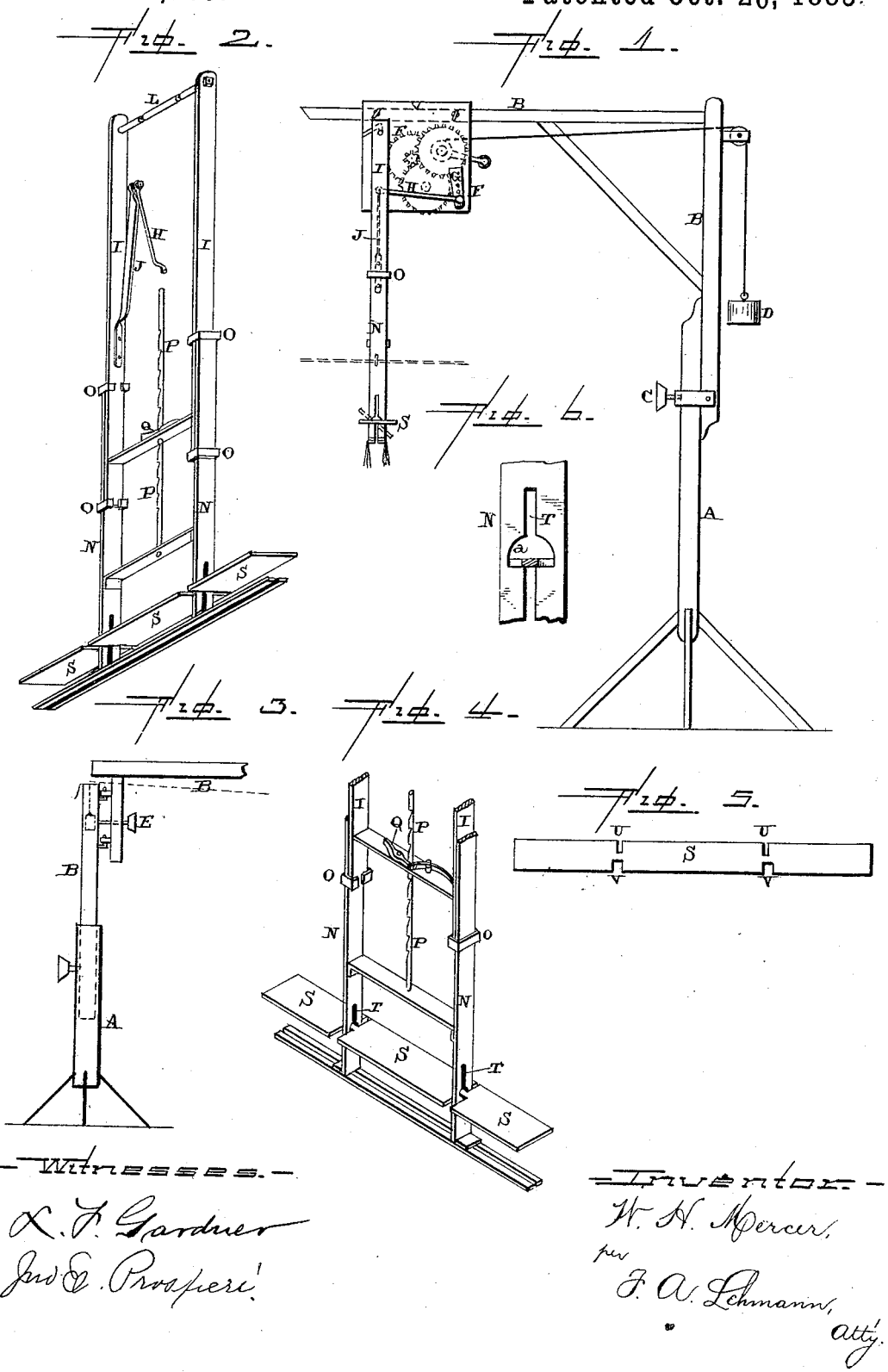

WILLIAM H. MERCER, OF MERCER, SOUTH CAROLINA.

AUTOMATIC FAN.

SPECIFICATION forming part of Letters Patent No. 328,705, dated October 20, 1885.

Application filed April 24, 1885. Serial No. 163,353. (No model.)

*To all whom it may concern:*

Be it known that I, WILLIAM H. MERCER, of Mercer, in the county of Union and State of South Carolina, have invented certain new and useful Improvements in Automatic Fans; and I do hereby declare the following to be a full, clear, and exact description of the invention, such as will enable others skilled in the art to which it pertains to make and use it, reference being had to the accompanying drawings, which form part of this specification.

My invention relates to an improvement in automatic fans; and it consists in, first, the combination of a suitable support, a motor provided with a crank and connecting-rod, a swinging frame, and a spring which is connected to the frame for the purpose of causing the frame to swing in such a manner as to carry the crank over the centers and thus produce an even, steady movement; second, the combination of the swinging frame and sliding extension which is loosely attached to its lower end, a ratchet-rod which is attached to the extension, and a suitable catch which is attached to the swinging frame for the purpose of holding the extension in any desired position; third, the combination of the extension upon the swinging frame, and which has its lower end slotted with a flat plate or fan which can be turned into a horizontal position so as not to be brought into use, or into a vertical position so as to act as a fan; fourth, the arrangement and combination of the parts which will be more fully described hereinafter.

The object of my invention is to provide an automatic fan which can be placed beside the bed or dining-table or secured to any suitable support, and which when started in operation will both keep away insects and act as a fan at the same time.

Figure 1 is a side elevation of a machine embodying my invention complete. Figs. 2 and 4 are perspectives of the swinging frame. Fig. 3 shows the frame hinged to a suitable support, so that it can be swung around out of the way when not needed. Fig. 5 is a plan view of the fan. Fig. 6 is a detail view.

A represents a suitable stand or support, which may either be made solid, as shown in Fig. 1, or hollow, as shown in Fig. 3, as may be desired. Where this stand is made solid, as shown in Fig. 1, the supporting-frame B will be attached to it by means of a suitable clamp, C, in such a manner that the frame B can be adjusted vertically for the purpose of bringing the fan in any desired relation to the object over which it is to be moved back and forth. Where this stand is made hollow, as shown in Fig. 3, the vertical part of the frame B will have its end inserted in the top of the stand, as shown, and then be held in any desired position by means of a set-screw. Where a hollow stand, A, is used, the vertical part B will also be made hollow, so as to serve as a guide in which the operating-weight D moves up and down.

The frame B may either be attached rigidly to the stand A or the horizontal portion of the frame may be hinged to the vertical part, as shown in Fig. 3, so that the fan can be turned freely around in any position. Where the hinges are used, the fan can be swung around out of the way when no longer needed. These hinges may be secured to a wall or to the supporting-stand, as here shown, as may be preferred.

When the horizontal part of the support B is hinged to the vertical part, a set-screw, E, is passed through the swinging portion, so as to bear against the vertical one, and thus hold the swinging portion in whatever position it may be adjusted.

Adjustably secured to the horizontal portion of the support B is a motor, F, of any suitable construction, and which may either be operated by means of a weight, D, as here shown, or by a spring, as may be preferred. This motor will consist of a train of wheels of any desired length, according to the time it is desired that the fan shall be kept in operation.

To the shaft of the last wheel of the train is attached the crank G, which is provided with a suitable number of perforations, so that the connecting-rod H, which is attached thereto, can be adjusted so as to give the swinging frame I a longer or shorter movement, as may be preferred. The opposite end of the connecting-rod from the crank G is connected to a spring, J, which is attached to the side of the frame I, for the purpose of causing the frame to swing further and to allow the crank G to pass its centers with less friction than it will do where the end of the connecting-rod is attached directly to the frame or to a rigid body. The spring J, forming a yielding attachment, allows the frame I to be moved with much less force, and causes the parts to operate more noiselessly than they would do without the use of this spring. The motor F can be adjusted back and forth upon the horizontal part of the support B, and the swinging frame I is loosely attached to the motor by means of the rod L, which catches in a notched slot which is made in the edge of the frame of the motor, as shown in Fig. 1.

When it is desired to remove the swinging frame from the support, it is only necessary to disconnect one end of the connecting-rod from the crank and then lift upward upon the frame I until the rod L is lifted out of the notch, and then the swinging frame can be disconnected from the frame of the motor, as shown in Fig. 2. In order to return the swinging frame to position the rod L is forced into the inclined slot in the edge of the motor, and then the end of the connecting-rod is again attached to the crank.

To the lower end of the swinging frame I is connected the sliding frame or extension N by means of the guides or holding devices O. This frame N slides vertically upon the frame I, and is held in any desired position by means of the notched rod P, which is secured to the cross-bar in the frame N, and which passes through a corresponding cross-bar in the frame I.

Upon the top of the cross-bar and frame I is placed a spring-actuated catch, Q, which engages with the notched rod P, and thus holds the frame N in any desired position. A person wishing to raise the frame upward, so as to raise the fan or brush out of the way, has but to catch hold of the frame N and lift it upward, when the notched rod will slide freely past the catch Q and then remain supported wherever it is left. To lower the frame N, the catch must be operated by hand so as to release the notched rod P.

Secured to the lower end of the frame N, which is slotted, as shown in Figs. 1, 2, and 4, are strips of any suitable material which forms a fly-brush for keeping away insects. When it is desired to fan a person, the flat plate S, which is notched, as shown in Figs. 2 and 5, is passed through the slots T in the frame N, and is then supported either in a horizontal position, in which case no currents of air are created as the frame swings back and forth, because the edges of the plate are turned in the direction of the motion; but when this fan is turned into a vertical position it acts as a fan and causes drafts of air in proportion to the length of the motion given to the swinging frame. Where only insects are to be kept away, the fan will be turned into the horizontal position shown in Figs. 2 and 4; but when it is to be used as a fan, it will be turned into a vertical or inclined position, as shown by dotted lines in Fig. 1.

For the purpose of supporting the fan S, it is provided with the notches U on one side and the notches V upon the other side, the notches V being about double the width of the ones U.

In order to insert the fan into place it is turned into a vertical position, so that it stands in a line with the slots T, and then it is forced through the slots until the notches U V come just opposite the vertical portions of the frame N. At suitable places in the slot T are made enlargements or shoulders $a$, upon which the parts between the notches U V catch and rest, and thus support the fan in a vertical position. When the fan S is turned into a vertical position, it simply rests in the slots T, and cannot drop downward, because the ends of the sides of the frame N are closed.

One motor may be made to operate a number of swinging fans, in which case the swinging frames will be connected together by means of rods or wires, which will cause all of the frames to swing together. Where there is a long table, a number of fans will be necessary, and by connecting them together they can all be operated at the same time.

Where it is desired to prevent all noise when the machine is in operation, the last pinion of the train of wheels will be vulcanized or covered with rubber, so that no noise will be made as its cogs or teeth are struck by the wheel with which it meshes.

Having thus described my invention, I claim—

1. The combination of a suitable support, a motor placed thereon and provided with a crank, with the swinging frame provided with a spring, and the connecting-rod which connects the spring and the crank together, substantially as shown.

2. The combination of a suitable support, the motor F, attached thereto and provided with a crank having a series of perforations, the connecting-rod, and the swinging frame provided with a fan or brush, and having a spring to which one end of the connecting-rod is attached, substantially as described.

3. The combination of the swinging frame provided with a perforated cross-bar near its lower end, and the frame N, loosely connected to and sliding upon the swinging frame, and also provided with a cross-bar with the ratchet-rod P, which is connected to the frame N, and the spring-actuated catch on the swinging frame for engaging with the rod, substantially as set forth.

4. The combination of the frame N, provided with the slots T and enlargement $a$, with the fan provided with the notches U V, whereby the fan can be supported in a horizontal position when not in use, substantially as specified.

In testimony whereof I affix my signature in presence of two witnesses.

W. H. MERCER.

Witnesses:
F. A. LEHMANN,
B. LEWIS BLACKFORD.